United States Patent
Hori et al.

(10) Patent No.: US 11,413,700 B2
(45) Date of Patent: Aug. 16, 2022

(54) METHOD FOR MANUFACTURING HEAT TRANSFER PLATE

(71) Applicant: NIPPON LIGHT METAL COMPANY, LTD., Tokyo (JP)

(72) Inventors: Hisashi Hori, Shizuoka (JP); Nobushiro Seo, Shizuoka (JP); Kosuke Yamanaka, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 17/058,601

(22) PCT Filed: May 7, 2019

(86) PCT No.: PCT/JP2019/018216
§ 371 (c)(1),
(2) Date: Nov. 24, 2020

(87) PCT Pub. No.: WO2020/044663
PCT Pub. Date: Mar. 5, 2020

(65) Prior Publication Data
US 2021/0213561 A1    Jul. 15, 2021

(30) Foreign Application Priority Data
Aug. 27, 2018 (JP) .............................. JP2018-158741

(51) Int. Cl.
*B23K 20/00* (2006.01)
*B23K 20/12* (2006.01)

(52) U.S. Cl.
CPC ................... *B23K 20/1255* (2013.01)

(58) Field of Classification Search
CPC .............. B23K 20/1255; B23K 20/126; B23K 2101/14; B23K 20/122; B23K 20/1265;
(Continued)

(56) References Cited

U.S. PATENT DOCUMENTS 7,275,675 B1 * 10/2007 Carter ................ B23K 20/1255
                                                  228/112.1
7,494,040 B2 * 2/2009 Babb ................. B23K 20/1225
                                                  228/2.1
(Continued)

FOREIGN PATENT DOCUMENTS

| CN | 111032268 A | 4/2020 |
| JP | 2004-314115 A | 11/2004 |

(Continued)

OTHER PUBLICATIONS

Office Action for Chinese Patent Application No. 201980035227.0 (dated Sep. 3, 2021).
(Continued)

*Primary Examiner* — Erin B Saad
(74) *Attorney, Agent, or Firm* — Merchant & Gould P.C.

(57) ABSTRACT

The present invention is characterized by including a heat medium pipe insertion process to insert a heat medium pipe into a concave groove; a lid plate insertion process to insert a lid plate into a lid groove; and a joining process to perform friction stirring while a primary joining rotary tool provided with a base side pin and a tip side pin is moved along a butted portion of a side wall of the lid groove and a side face of the lid plate, wherein in the joining process, friction stirring is performed while the tip side pin of the primary rotary tool which is rotating is inserted into the butted portion and an outer circumferential face of the base side pin is in contact with the base member and the lid plate, and plastically fluidized material fluidized by frictional heat is flowed into a void portion formed adjacent to the heat medium pipe.

6 Claims, 12 Drawing Sheets

(58) Field of Classification Search
CPC .......... B23K 20/129; B23K 2101/045; B23K 2103/10; B23K 20/1225; B23K 20/1235; B23K 20/123; B23K 20/124; B23K 2101/36; B23K 20/12; B23K 20/2336; B23K 2101/04; B23K 2101/18; B23K 2103/18; B23K 20/1245; B23K 20/127; B23K 20/227; B23K 20/24; B23K 2101/06; B23K 2103/05; B23K 31/125; B23K 33/006; B23K 37/0235; B23K 37/0531

See application file for complete search history.

(56) References Cited

U.S. PATENT DOCUMENTS

| | | | | |
|---|---|---|---|---|
| 8,434,661 | B2* | 5/2013 | Hovanski | B23K 20/1255 228/112.1 |
| 11,059,125 | B2* | 7/2021 | Rosal | B23K 20/1255 |
| 2003/0209588 | A1 | 11/2003 | Colligan | |
| 2005/0246884 | A1* | 11/2005 | Chen | B23K 20/1225 29/525 |
| 2007/0241163 | A1* | 10/2007 | Valant | B23K 20/1255 228/2.1 |
| 2008/0154423 | A1* | 6/2008 | Badarinarayan | B23K 20/123 700/175 |
| 2018/0272479 | A1* | 9/2018 | Hori | B23K 20/1265 |
| 2019/0358740 | A1* | 11/2019 | Hori | B23K 20/122 |
| 2020/0147718 | A1* | 5/2020 | Hori | B23K 20/1225 |
| 2020/0324365 | A1* | 10/2020 | Hori | B23K 20/122 |
| 2021/0053144 | A1* | 2/2021 | Hori | B23K 20/1235 |

FOREIGN PATENT DOCUMENTS

| | | |
|---|---|---|
| JP | 4210148 B2 | 1/2009 |
| JP | 2009-297761 A | 12/2009 |
| JP | 2016-215264 A | 12/2016 |
| KR | 20110088266 A | 8/2011 |
| WO | 2009/104426 A1 | 8/2009 |

OTHER PUBLICATIONS

International Search Report for No. PCT/JP2019/018216 dated Jul. 9, 2019.

Office Action for corresponding CN Application No. 201980035227.0 (dated Apr. 12, 2022).

* cited by examiner

METHOD FOR MANUFACTURING HEAT TRANSFER PLATE

This application is a National Stage Application of PCT/JP2019/018216, filed May 7, 2019, which claims benefit of priority to Japanese Patent Application No. 2018-158741, filed Aug. 27, 2018, which applications are incorporated herein by reference. To the extent appropriate, a claim of priority is made to each of the above disclosed applications.

TECHNICAL FIELD

The present invention relates to a method for manufacturing a heat transfer plate.

BACKGROUND ART

A method for manufacturing a heat transfer plate to perform heat exchange or the like while flowing fluid in a flow path formed inside a base member is disclosed in the patent literature 1. A lid groove opening on the surface of the base member and a concave groove formed on a bottom face of the lid groove are formed in the base member. When a heat transfer plate is manufactured, a heat medium pipe is inserted into the concave groove and a lid plate is inserted into the lid groove, then friction stir welding is performed to a butted portion formed of a side face of the lid plate and a side wall of the lid groove.

As a rotary tool to be used for the friction stir welding, there is known one described in the patent literature 2. The rotary tool in the patent literature 2 is provided with a shoulder portion and a stirring pin hanging down from the shoulder portion. The shoulder portion and an outer circumferential face of the stirring pin each have a tapered face. A spiral groove is formed on the tapered face of the shoulder portion in a plan view. A cross section of the spiral groove has a half circle shape.

CITATION LIST

Patent Literature

Patent Literature 1: JP 2004-314115, A
Patent Literature 2: JP 4210148, B2

SUMMARY OF INVENTION

Technical Problem

In the case of the prior art of the patent literature 1, since a space portion is defined by the concave groove, an lower face of the lid plate and the heat medium pipe, it is difficult for heat radiated from the heat medium pipe to be transferred to the lid plate. Hence, there is a problem that the heat exchange efficiency of the heat transfer plate is lowered.

In the case of the prior art of the patent literature 2, since plastically fluidized material enters the groove on the tapered face, there is a problem that the groove stops working. In addition, when plastically fluidized material enters the groove, friction stirring is performed in a state that the plastically fluidized material is adhered to the groove. Hence, the adhered material and metal members to be joined are rubbed against each other, so there is a problem that the joining quality is lowered. Further, there are problems that surfaces of the metal members to be joined become rough, more burrs are generated, and a step concave groove on the surfaces of the metal members becomes larger.

From such a view point, it is an object of the present invention to provide a method for manufacturing a heat transfer plate having a high heat exchange efficiency. In addition, it is also an object of the present invention to provide a method for manufacturing a heat transfer plate, the method being capable of making the step concave groove on the surfaces of the metal members smaller and reducing the joined surface roughness.

Solution to Problem

In order to solve the problem, the present invention is characterized by a method for manufacturing a heat transfer plate, comprising: a heat medium pipe insertion process to insert a heat medium pipe into a concave groove formed in a bottom face of a lid groove which opens to a front face of a base member; a lid plate insertion process to insert a lid plate into the lid groove; and a joining process to perform friction stirring while a rotary tool provided with a base side pin and a tip side pin is moved along a butted portion formed by a side wall of the lid groove and a side face of the lid plate being butted against each other, wherein a taper angle of the base side pin of the rotary tool is larger than another taper angle of the tip side pin, wherein a stepwise step portion is formed on an outer circumferential face of the base side pin, and wherein in the joining process, friction stirring is performed while the tip side pin of the rotary tool which is rotating is inserted into the butted portion and the outer circumferential face of the base side pin is in contact with the base member and the lid plate, and plastically fluidized material fluidized by frictional heat is flowed into a void portion formed adjacent to the heat medium pipe.

According to this method, since the base member and the lid plate can be pressed by the outer circumferential face of the base side pin having a larger taper angle, a step concave groove on the joined surface can be made smaller and a bulge to be formed beside the step concave groove can be prevented from being generated or can be made smaller. Since the stepwise step portion is shallower and the outlet thereof is wider, plastically fluidized material is hard to adhere to the outer circumferential face of the base side pin though the metal members are pressed by the base side pin. Accordingly, the joined surface roughness can be made smaller and the joining quality can be suitably made stable. Further, by providing the tip side pin, the rotary tool is easily inserted into a deeper position. And further, since the void portion can be filled up by flowing plastically fluidized material into the void portion, heat can be efficiently transferred between the heat medium pipe and the base member and the lid plate around the heat medium pipe. Hereby, a heat transfer plate having a high heat exchange efficiency can be manufactured. For example, heat radiated from the heat medium pipe can be efficiently transferred to the base member and the lid plate around the heat medium pipe.

It is preferable that in the joining process, a tip of the tip side pin is inserted deeper than the bottom face of the lid groove. Further, it is preferable that in the joining process, the closest distance between a tip of the tip side pin and a virtual vertical plane in contact with the heat medium pipe is 1 to 3 mm. According to this method, plastically fluidized material can be steadily flowed into the void portion.

It is preferable that after the joining process, the method further comprises: an upper lid plate insertion process to insert an upper lid plate into an upper lid groove formed on a surface side with respect to the lid groove and wider than the lid groove; and an upper lid joining process to perform friction stirring while the rotary tool provided with the base side pin and the tip side pin is moved along an upper butted portion formed by a side wall of the upper lid groove and a side face of the upper lid plate being butted against each other, and in the upper lid joining process, the friction stirring is performed while the tip side pin of the rotary tool which is rotating is inserted into the upper butted portion and the outer circumferential face of the base side pin is in contact with the base member and the upper lid plate. According to this method, since further friction stirring is performed with use of the upper lid plate wider than the lid plate on the front face side of the lid plate of the heat transfer plate, the heat medium pipe can be disposed at a deeper position.

Advantageous Effects of Invention

According to the method for manufacturing a heat transfer plate according to the present invention, the heat transfer plate having a high heat exchange efficiency can be manufactured. Furthermore, according to the method for manufacturing a heat transfer plate according to the present invention, the step concave groove on the front faces of the metal members can be made smaller and the joined surface roughness can be reduced.

DESCRIPTION OF EMBODIMENTS

Figure 1:
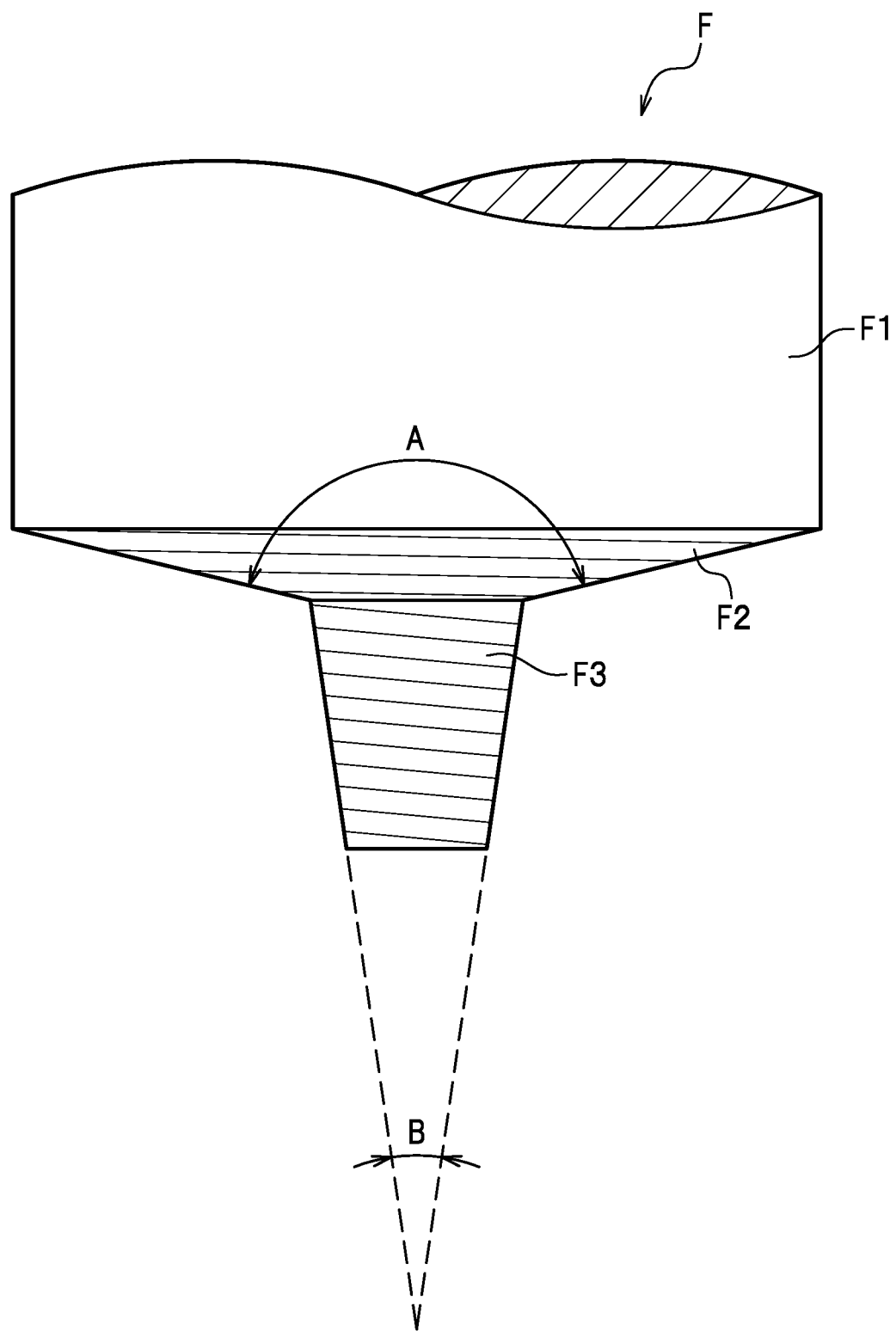
FIG. 1 is a side view showing a primary joining rotary tool to be used for a joining method according to a first embodiment of the present invention.

An embodiment of the present invention will be described appropriately with reference to Figures. First, a primary joining rotary tool (rotary tool) which is used in a joining method according to the present embodiment will be described. The primary joining rotary tool is a tool to be used for friction stir welding. The primary joining rotary tool F is made of, for example, tool steel, and is mainly formed of a base portion F1, a base side pin F2 and a tip side pin F3 as shown in FIG. 1. The base portion F1 has a cylindrical shape and is a portion to be connected to a spindle of a friction stir device.

Figure 2:
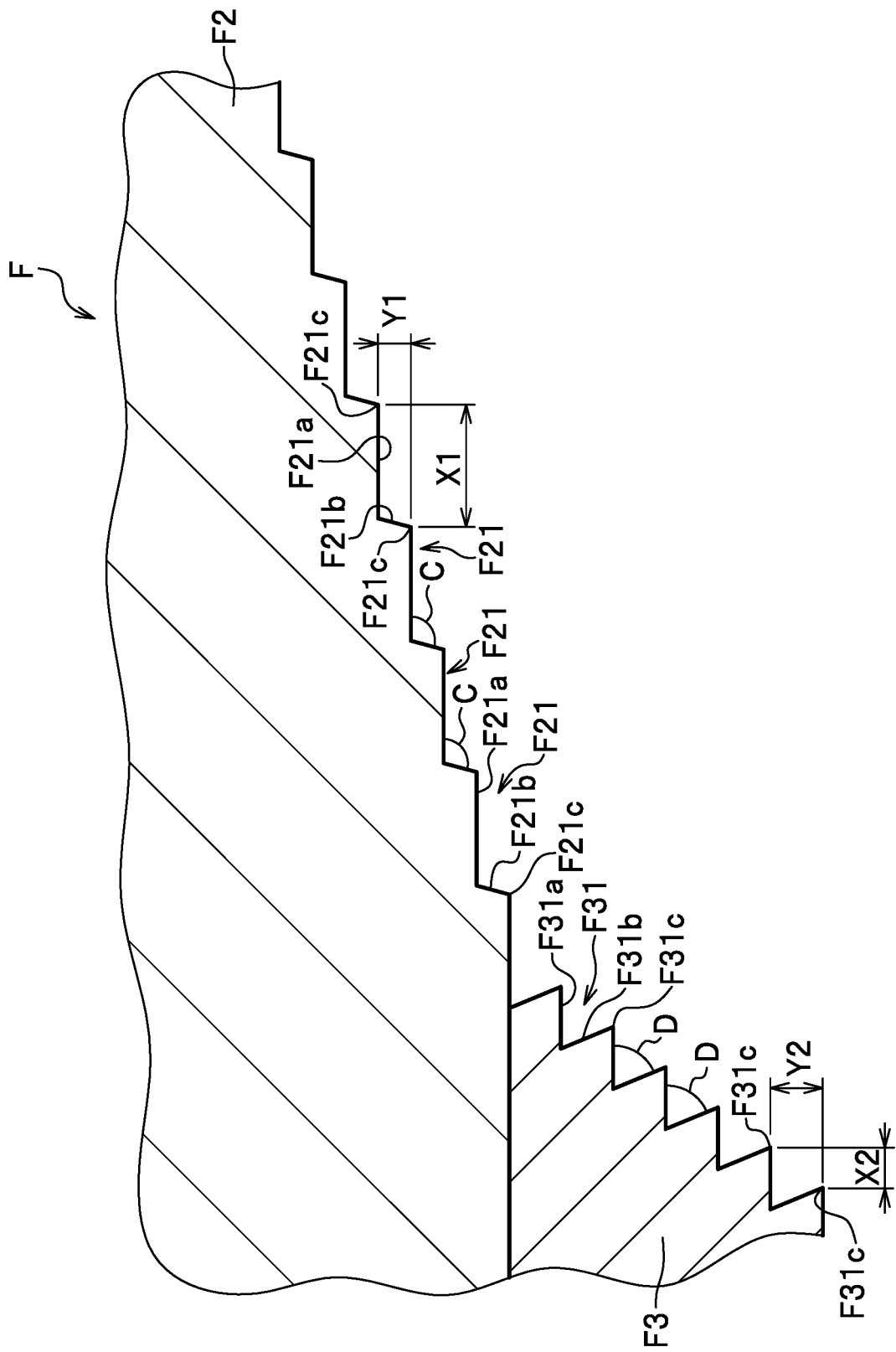
FIG. 2 is an enlarged sectional view of the primary joining rotary tool.

The base side pin F2 is continuous with the base portion F1, and has a tapered shape in which a diameter of the base side pin F2 is reduced toward a tip of the base side pin F2. The base side pin F2 has a frustoconical shape. A taper angle A of the base side pin F2 can be appropriately set, and is, for example, 135 to 160°. In a case where the taper angle A is less than 135° or greater than 160°, joined surface roughness after friction stirring becomes larger. Further, the taper angle A is larger than a taper angle B of the tip side pin F3 to be described later. As shown in FIG. 2, the base side pin F2 has a stepwise step portion F21 on an outer circumferential face of the base side pin F2 along the whole height of the base side pin F2. The step portion F21 is spirally formed in a clockwise or counterclockwise direction. In other words, the step portion F21 is spiral in a plan view and stepwise in a side view. In this embodiment, the step portion F21 is set to be counterclockwise from a base end side toward the tip side since the primary joining rotary tool F is rotated clockwise.

In addition, in a case where the primary joining rotary tool F is rotated counterclockwise, it is preferable that the step portion F21 is set to be clockwise from the base end side toward the tip side. Hereby, plastically fluidized material is guided toward the tip side by the step portion F21. Hence, the amount of metal to be leaked out of metal members to be joined can be reduced. The step portion F21 is formed of a step bottom face F21a and a step side face F21b. A distance (horizontal distance) X1 between adjacent vertices F21c and F21c of the step portion F21 is appropriately set according to a height Y1 of the step side face F21b and a step angle C to be described later.

The height Y1 of the step side face F21b may be appropriately set, and is set, for example, to be 0.1 to 0.4 mm. In a case where the height Y1 is less than 0.1 mm, the joined surface roughness becomes larger. On the other hand, in a case where the height Y1 is greater than 0.4 mm, the joined surface roughness tends to become larger and the number of effective step portions (the number of the step portions F21 being in contact with the metal members to be joined) is reduced.

The step angle C defined by the step bottom face F21a and the step side face F21b may be set appropriately, and is set to, for example, 85 to 120°. The step bottom face F21a is parallel with a horizontal plane in this embodiment. The step bottom face F21a may be inclined from the axis of the tool toward the outer circumferential face in the range of −5° to 15° with respect to a horizontal plane. A minus means lower with respect to the horizontal plane, and a plus means upper with respect to the horizontal plane. The distance X1, the height Y1 of the step side face F21b, the step angle C and the angle of the step bottom face F21a with respect to a horizontal plane are appropriately set so that when friction stirring is performed, joined surface roughness can be reduced by pressing plastically fluidized material with the step bottom face F21a while the plastically fluidized material does not stay inside the step portion F21 nor adhere to the step portion F21 and the plastically fluidized material goes outside.

As shown in FIG. 1, the tip side pin F3 is formed continuously to the base side pin F2. The tip side pin F3 has a frustoconical shape. The tip side pin F3 has a flat face at the tip thereof. The taper angle B of the tip side pin F3 is smaller than the taper angle A of the base side pin F2. As shown in FIG. 2, the tip side pin F3 has a helical groove F31 on the outer circumferential face thereof. The helical groove F31 may be either clockwise or counterclockwise. In this embodiment, the helical groove F31 is formed to be counterclockwise from the base end side toward the tip side since the primary joining rotary tool F is rotated clockwise.

Note that, in a case where the primary joining rotary tool F is rotated counterclockwise, it is preferable that the helical groove F31 is formed to be clockwise from the base end side toward the tip side. Hereby, plastically fluidized material is led toward the tip side through the helical groove F31. Hence, the amount of metal overflowing outside the metal members to be joined can be reduced. The helical groove F31 is formed of a helical bottom face F31a and a helical side face F31b. The distance (horizontal distance) between adjacent vertices F31c and F31c of the helical groove F31 is set to a length X2. A height of the helical side face F31b is set to a height Y2. A helical angle D defined by the helical bottom face F31a and the helical side face F31b is set, for example, to 45 to 90°. The helical groove F31 has a role of leading plastically fluidized material toward the tip side as well as a role of rising frictional heat by coming into contact with the metal members to be joined.

Figure 3:
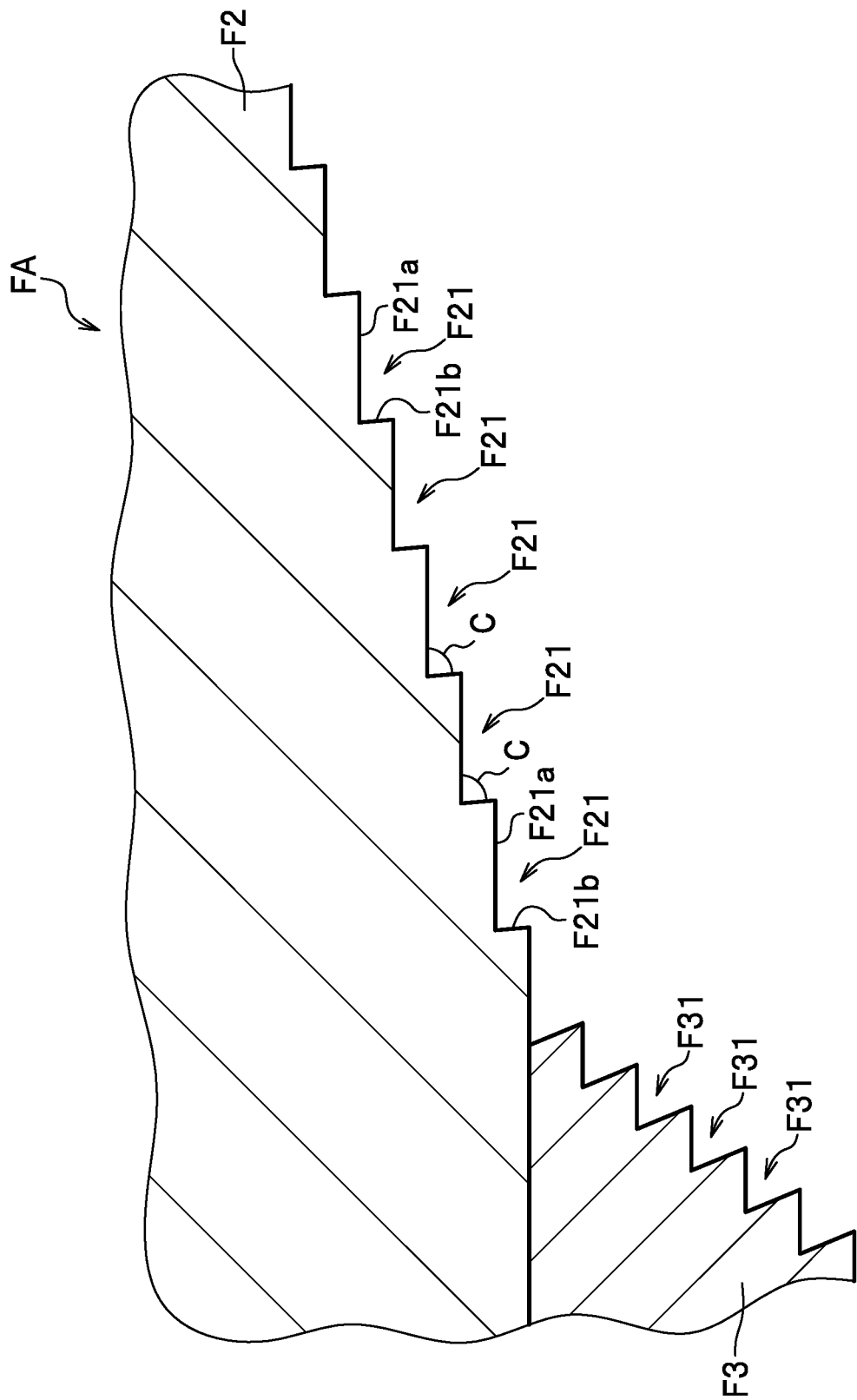
FIG. 3 is a sectional view showing a first modification of the primary joining rotary tool.

The design of the primary joining rotary tool F can be appropriately changed. FIG. 3 is a side view showing a first modification of the rotary tool of the present invention. As shown in FIG. 3, in the primary joining rotary tool FA according to the first modification, the step angle C defined by the step bottom face F21a and the step side face F21b of the step portion F21 is 85°. The step bottom face F21a is parallel with a horizontal plane. In this way, the step bottom face F21a is parallel with a horizontal plane and the step angle C may be an acute angle in a range in which plastically fluidized material can be led to the outside without staying in nor adhering to the inside of the step portion F21 when friction stirring is performed.

Figure 4:
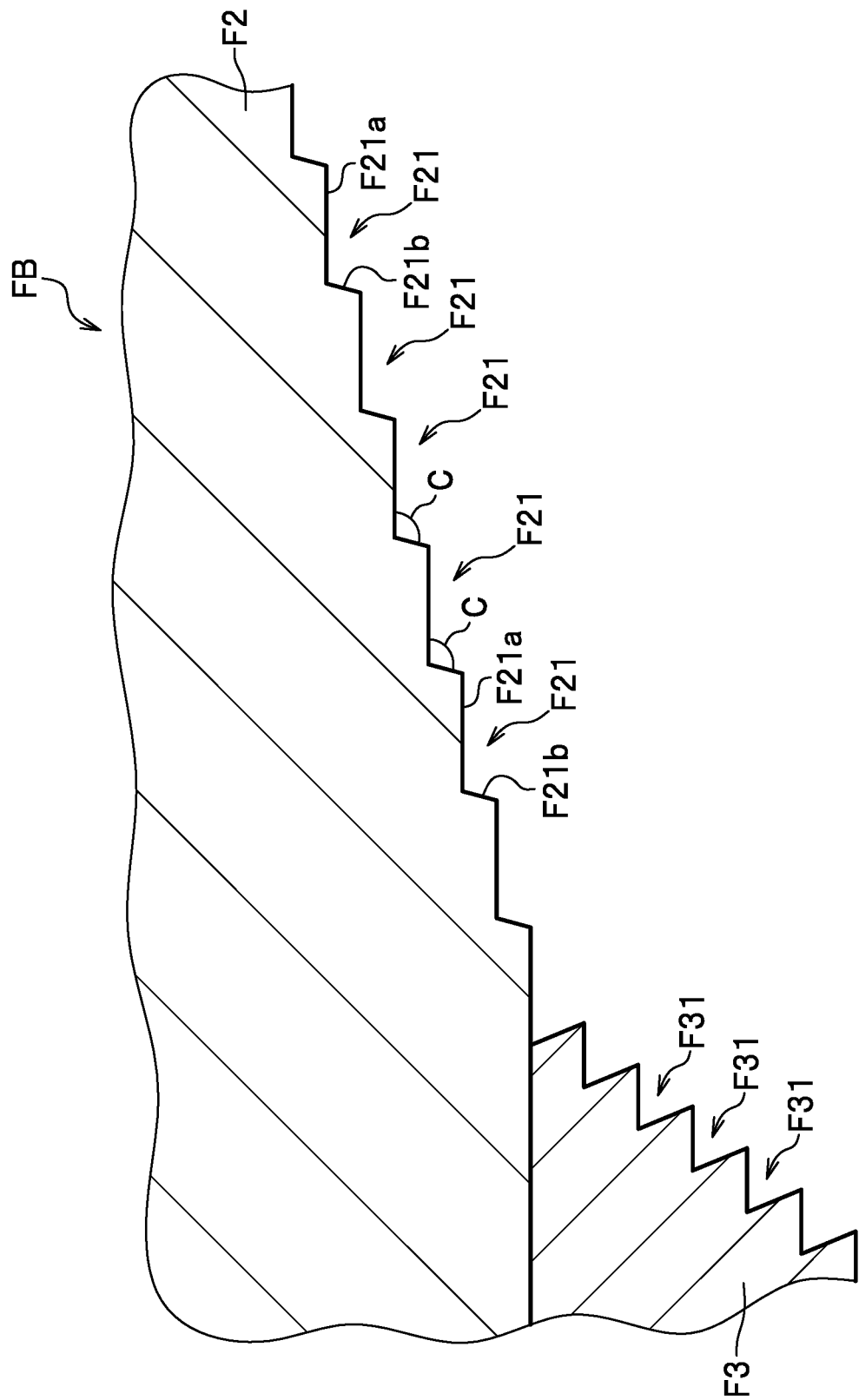
FIG. 4 is a sectional view showing a second modification of the primary joining rotary tool.

FIG. 4 is a side view showing a second modification of the primary joining rotary tool of the present invention. As shown in FIG. 4, in the primary joining rotary tool FB according to the second modification, the step angle C of the step portion F21 is 115°. The step bottom face F21a is parallel with a horizontal plane. In this way, the step bottom face F21a may be parallel with a horizontal plane and the step angle C may be an obtuse angle in a range of functioning as the step portion F21.

Figure 5:
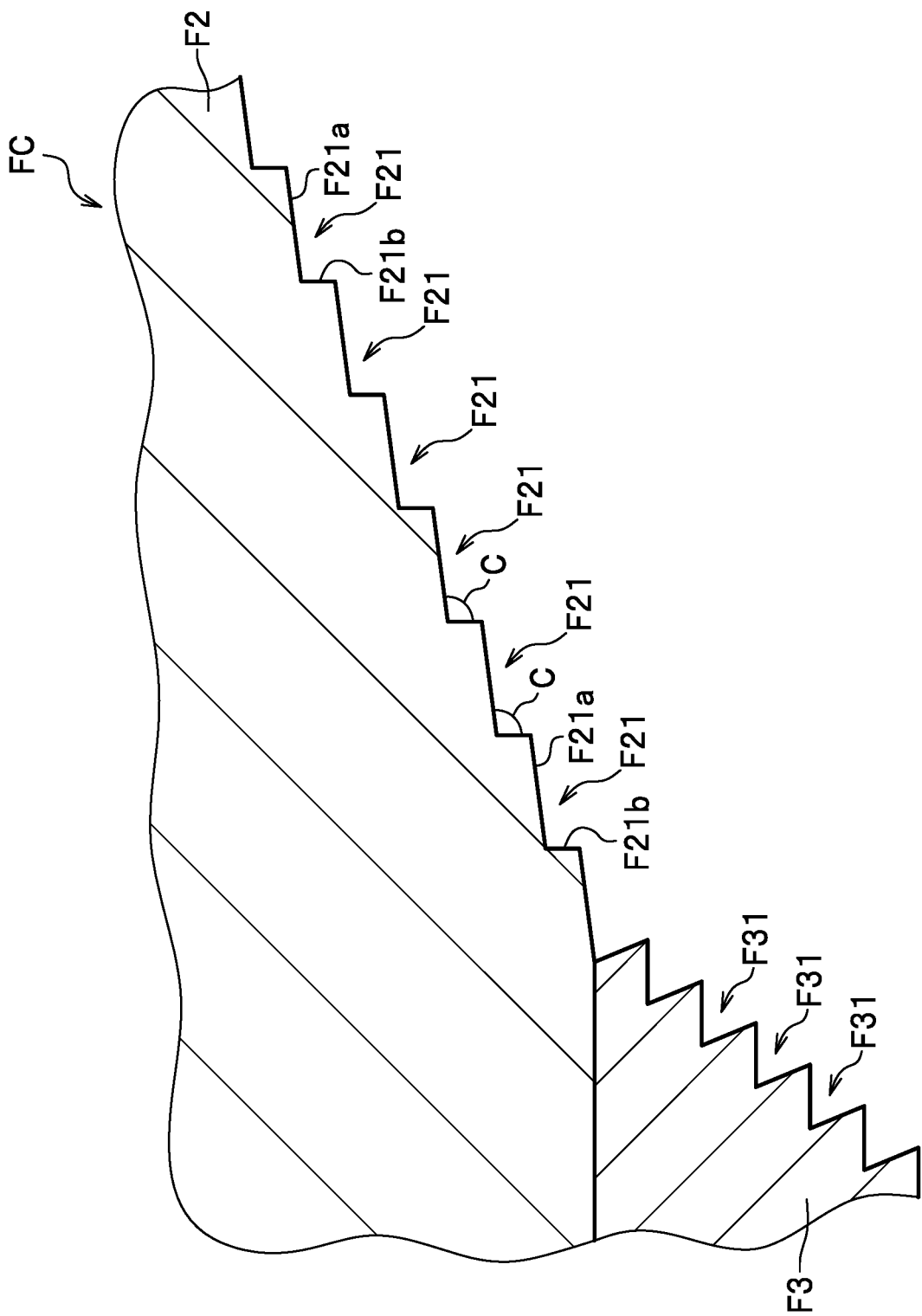
FIG. 5 is a sectional view showing a third modification of the primary joining rotary tool.

FIG. 5 is a side view showing a third modification of the primary joining rotary tool of the present invention. As shown in FIG. 5, in the primary joining rotary tool FC according to the third modification, the step bottom face F21a is inclined upward from the axis of the tool toward the outer circumferential face by 10° with respect to a horizontal plane. The step side face F21b is parallel with a vertical plane. In this way, the tool may be formed in such a form that the step bottom face F21a is inclined upward from the axis of the tool toward the outer circumferential face with respect to a horizontal plane. Each of the first to the third modifications of the primary joining rotary tool has the same advantageous effects as those of the following embodiments.

First Embodiment

Figure 6:
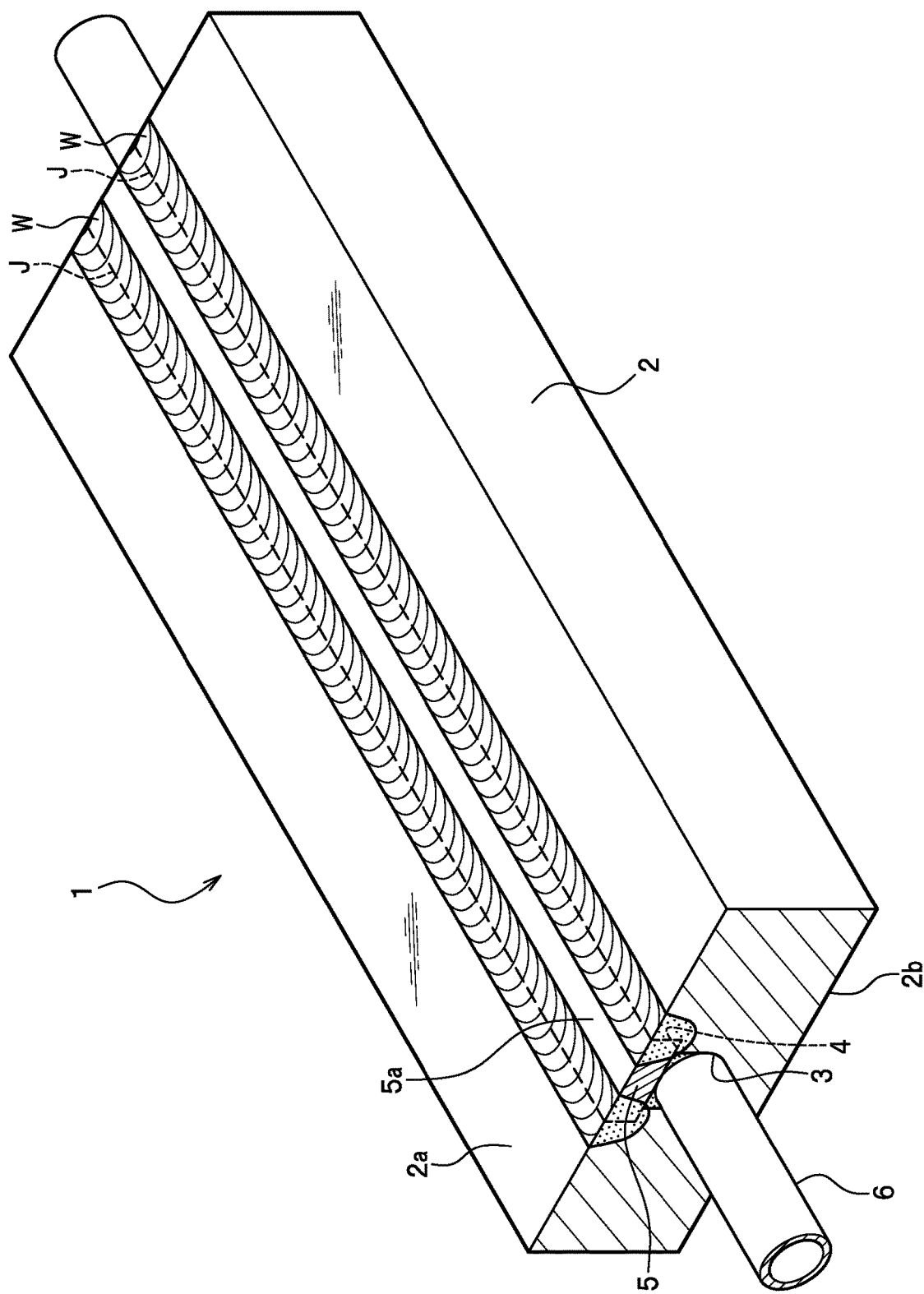
FIG. 6 is a perspective view showing a heat transfer plate according to the first embodiment of the present invention.

Next, a heat transfer plate of this embodiment will be described. "Front face" means the opposite face to "back face" in the following description. As shown in FIG. 6, the heat transfer plate 1 according to this embodiment is mainly formed of a base member 2, a lid plate 5 and a heat medium pipe 6. The base member 2 has a shape of an approximately rectangular parallelepiped. A concave groove 3 and a lid groove 4 are formed on the base member 2. Materials of the base member 2 and the lid plate 5 are not specifically limited as long as they can be frictionally stirred. In the embodiment, the materials are each an aluminum alloy. The base member 2 is made of, for example, a material having a hardness higher than that of the lid plate 5.

The concave groove 3 goes through the base member 2 at the middle portion thereof from one side face toward the other side face. The concave groove 3 is formed on the bottom face of the lid groove 4. The bottom portion of the concave groove 3 has an arc shape. The concave groove 3 is opened on the front face 2a side of the base member 2.

The lid groove 4 has a width wider than that of the concave groove 3 and is formed continuously with the concave groove 3 on the front face 2a side of the concave groove 3. The lid groove 4 has a rectangular shape in cross section and is opened to the front face 2a side.

The lid plate 5 is a plate-like member to be inserted into the lid groove 4. The lid plate 5 has the same shape as the hollow portion of the lid groove 4 to be capable of being inserted into the lid groove 4 without a gap.

Butted portions J, J are formed by butting respectively a pair of side walls of the lid groove 4 against a pair of side faces of the lid plate 5. Each of the butted portions J, J is joined along the whole depth by friction stirring.

The heat medium pipe 6 is a cylindrical member to be inserted into the concave groove 3. The inside of the heat medium pipe 6 is a passage in which fluid flows. The sizes and the like of the concave groove 3 and the heat medium pipe 6 may be appropriately set, and in the embodiment, the outer diameter of the heat medium pipe 6, the width and the depth of the concave groove 3 are substantially the same as one another.

Figure 7:
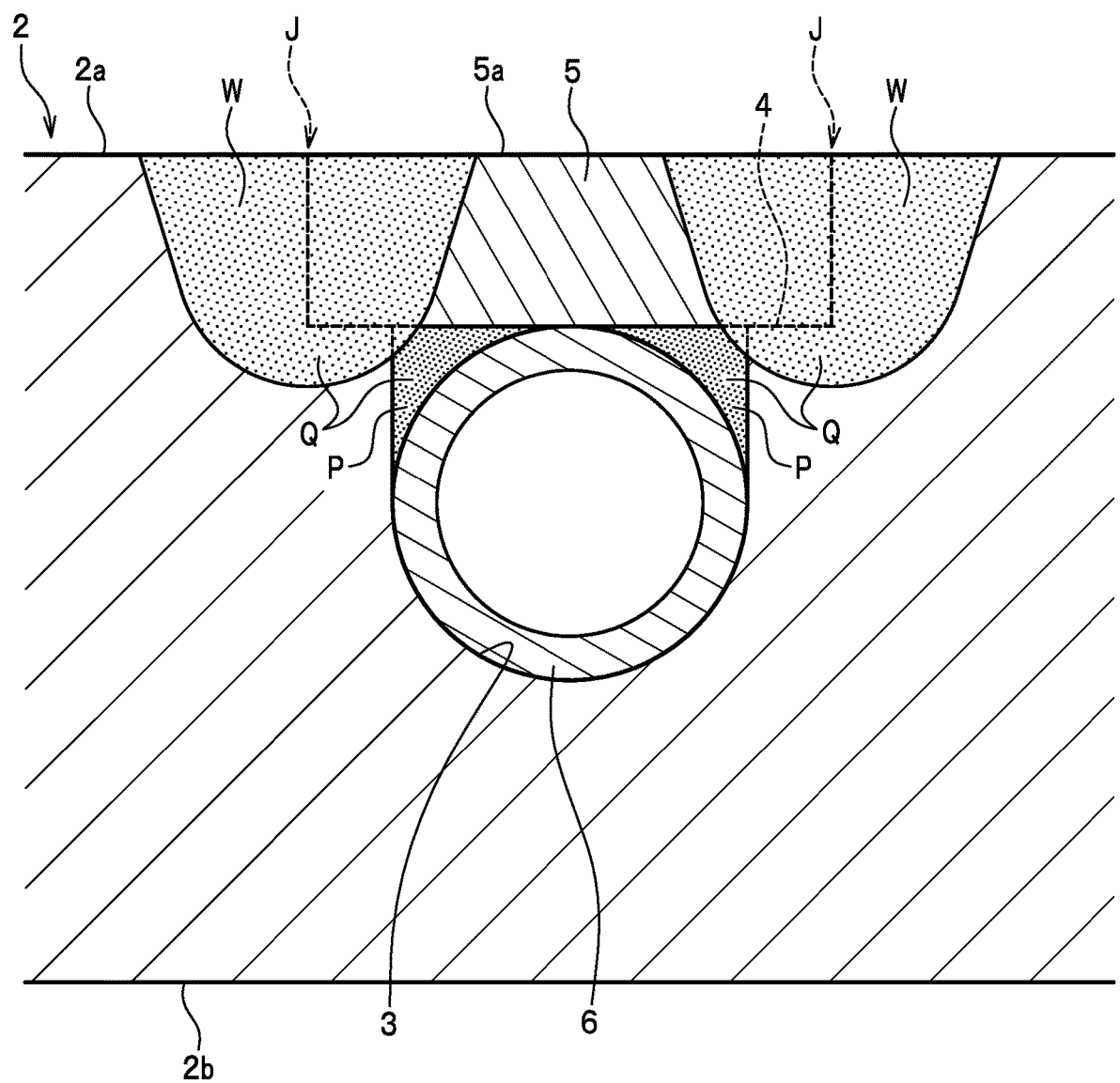
FIG. 7 is an enlarged sectional view showing the heat transfer plate according to the first embodiment of the present invention.

As shown in FIG. 7, void portions P are formed adjacent to the heat medium pipe 6 before a primary joining process described later is performed. The void portions P are formed by the concave groove 3, the lower face of the lid plate 5 and the heat medium pipe 6. Shapes of the void portions P are appropriately determined by shapes and the like of the concave groove 3, the lid plate 5 and the heat medium pipe 6, and in the embodiment, the void portions P are formed respectively on left and right sides with respect to a contact portion at which the top end of the heat medium pipe 6 and the lower face of the lid plate 5 are in contact (the number of the void portion P is two in total). The void portions P are filled up with plastically fluidized material Q formed by frictional heat generated by the primary joining rotary tool F.

Next, a method for manufacturing the heat transfer plate according to the first embodiment will be described. In the method for manufacturing the heat transfer plate, a preparation process, a heat medium pipe insertion process, a lid plate insertion process, a provisional joining process, and a primary joining process are performed.

Figure 8A:
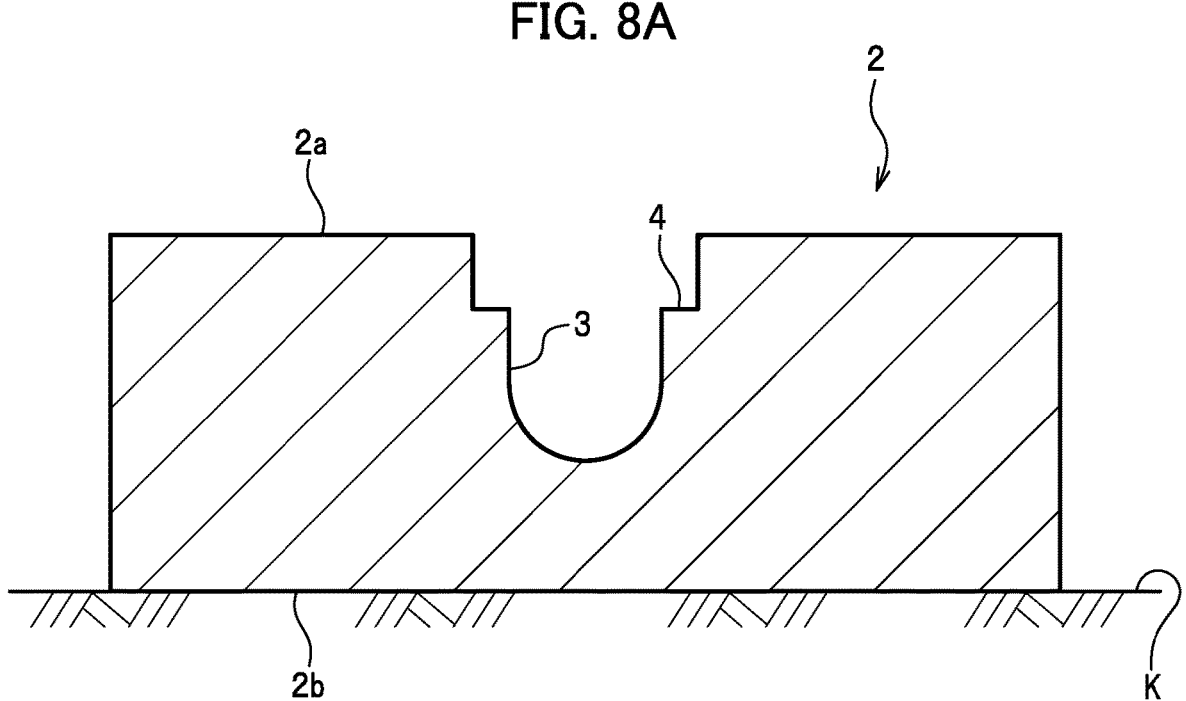
FIG. 8A is a sectional view showing a preparation process of a method for manufacturing the heat transfer plate according to the first embodiment.

As shown in FIG. 8A, the preparation process is a process to prepare the base member 2. First, the base member 2 is fixed onto a work table K by means of clamps (not shown). Next, the concave groove 3 and the lid groove 4 are formed by cutting with use of an endmill or the like. Note that, the base member 2 where the concave groove 3 and the lid groove 4 are formed beforehand by die casting, extrusion or the like may be used.

Figure 8B:
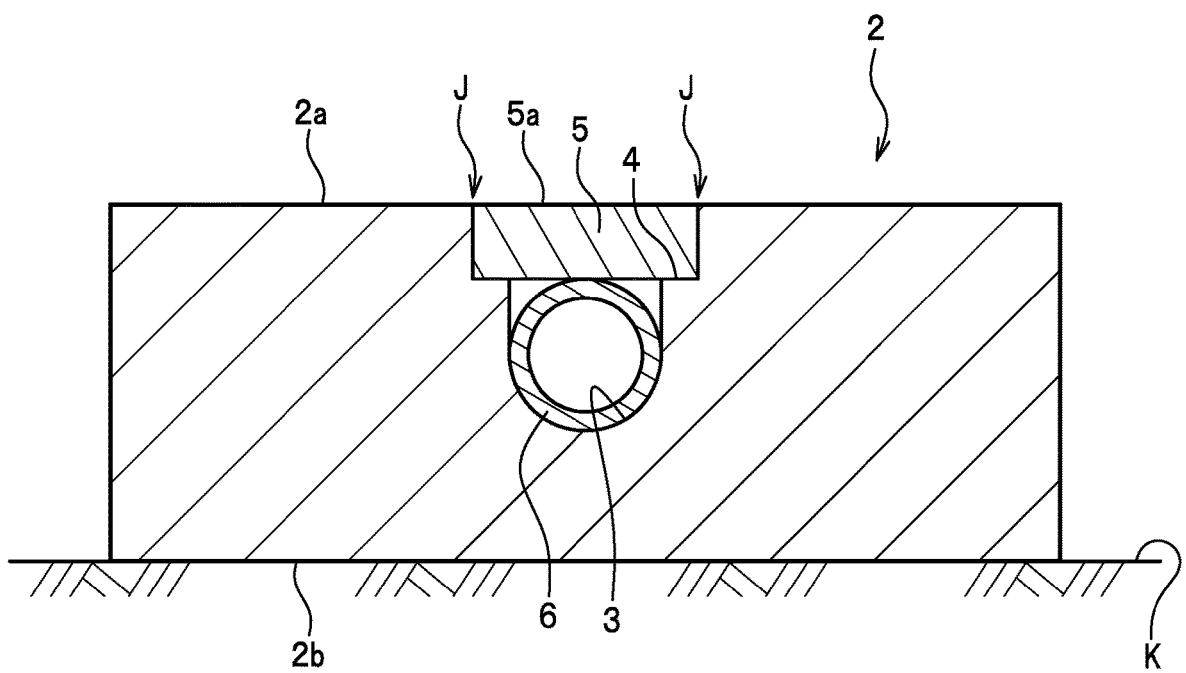
FIG. 8B is a sectional view showing a heat medium tube insertion process and a lid plate insertion process of the method for manufacturing the heat transfer plate according to the first embodiment.

As shown in FIG. 8B, the heat medium pipe insertion process is a process to insert the heat medium pipe 6 into the concave groove 3.

As shown in FIG. 8B, the lid plate insertion process is a process to insert the lid plate 5 into the lid groove 4. The butted portions J, J are formed by butting respectively the side walls of the lid groove 4 against the side faces of the lid plate 5. The upper face of the lid plate 5 is flush with the front face 2a. Tab members (not shown) may be disposed respectively on both side faces of the base member 2 located on an extension line of a butted portion J and a starting position and an ending position of friction stirring described later may be set on the tab members.

Figure 9A:
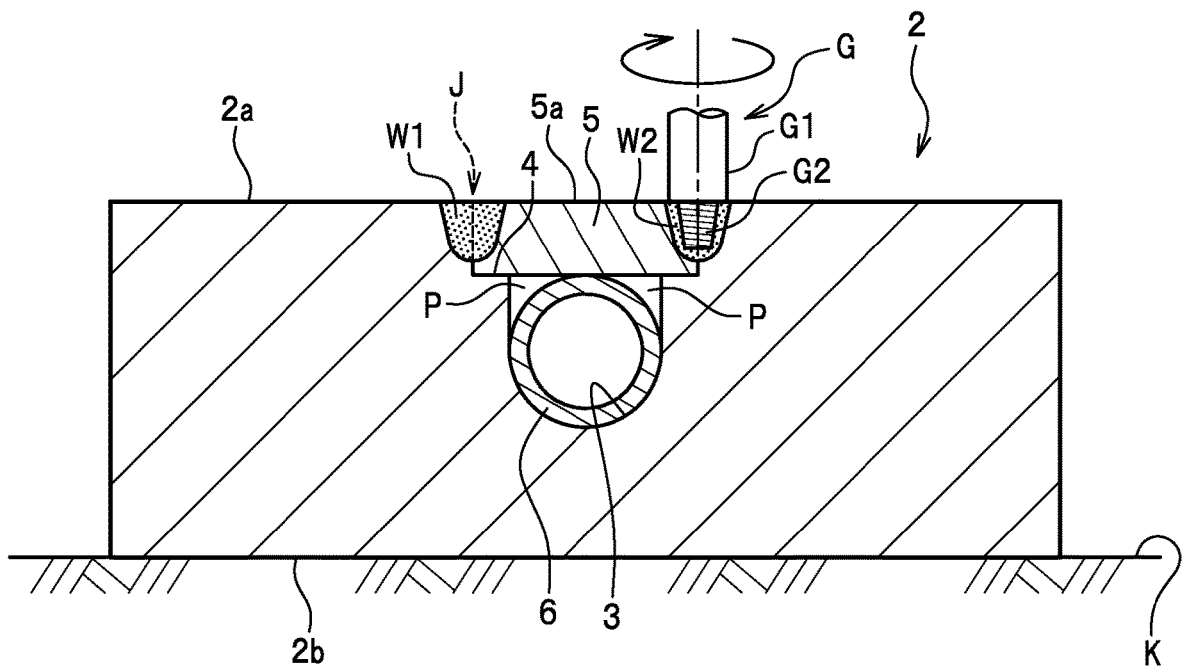
FIG. 9A is a sectional view showing a provisional joining process of the method for manufacturing the heat transfer plate according to the first embodiment.

As shown in FIG. 9A, the provisional joining process is a process to preliminarily perform friction stir welding to the butted portions J, J with use of a provisional joining rotary tool G. A starting position and an ending position of the provisional joining process are not specifically limited as long as they are set on the surface of the base member 2 or the tab members, but it is preferable that they are set on the surface of the tab members. Plasticized region W1 is formed along a moving track of the provisional joining rotary tool G.

Figure 9B:
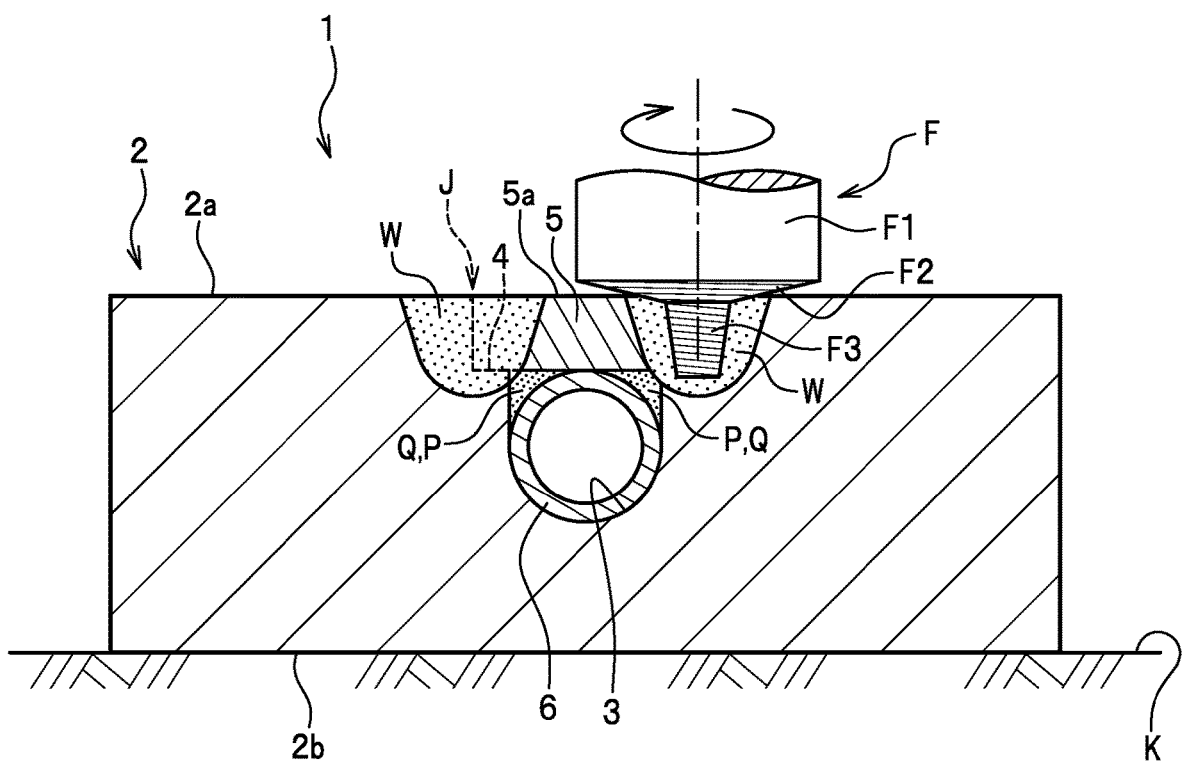
FIG. 9B is a sectional view showing a primary joining process of the method for manufacturing the heat transfer plate according to the first embodiment.

As shown in FIG. 9B, the primary joining process is a process to perform friction stir welding to the butted portions J, J with use of the primary joining rotary tool F. It is preferable that a starting position and an ending position of the primary joining process are set on the surface of the tab members. When the primary joining rotary tool F is inserted into a tab member, the hole after pulling out the provisional joining rotary tool G may be used, or a pilot hole may be newly formed on the tab member and the primary joining rotary tool F may be inserted into the pilot hole.

In the primary joining process, friction stir welding is performed in a state that the base side pin F2 and the tip side pin F3 are in contact with the base member 2 and the lid plate 5. Friction stir welding is performed while the tip side pin F3 of the primary joining rotary tool F which is rotating is inserted into a butted portion J and the outer circumferential face of the base side pin F2 presses the base member 2 and the lid plate 5. The primary joining rotary tool F is relatively moved along a butted portion J. Insertion depths of the base side pin F2 and the tip side pin F3 may be appropriately set in a range where the outer circumferential face of the base side pin F2 can press the base member 2 and the lid plate 5. For example, insertion depths of the base side pin F2 and the tip side pin F3 may be set in the range where the outer circumferential face of the base side pin F2 can press the base member 2 and the lid plate 5 and the tip side pin F3 reaches the bottom face of the lid groove 4. In the embodiment, the insertion depths are set so that a middle portion of the outer circumferential face of the base side pin F2 in the height direction comes into contact with the front face 2a of the base member 2 and the front face 5a of the lid plate 5.

Figure 10:
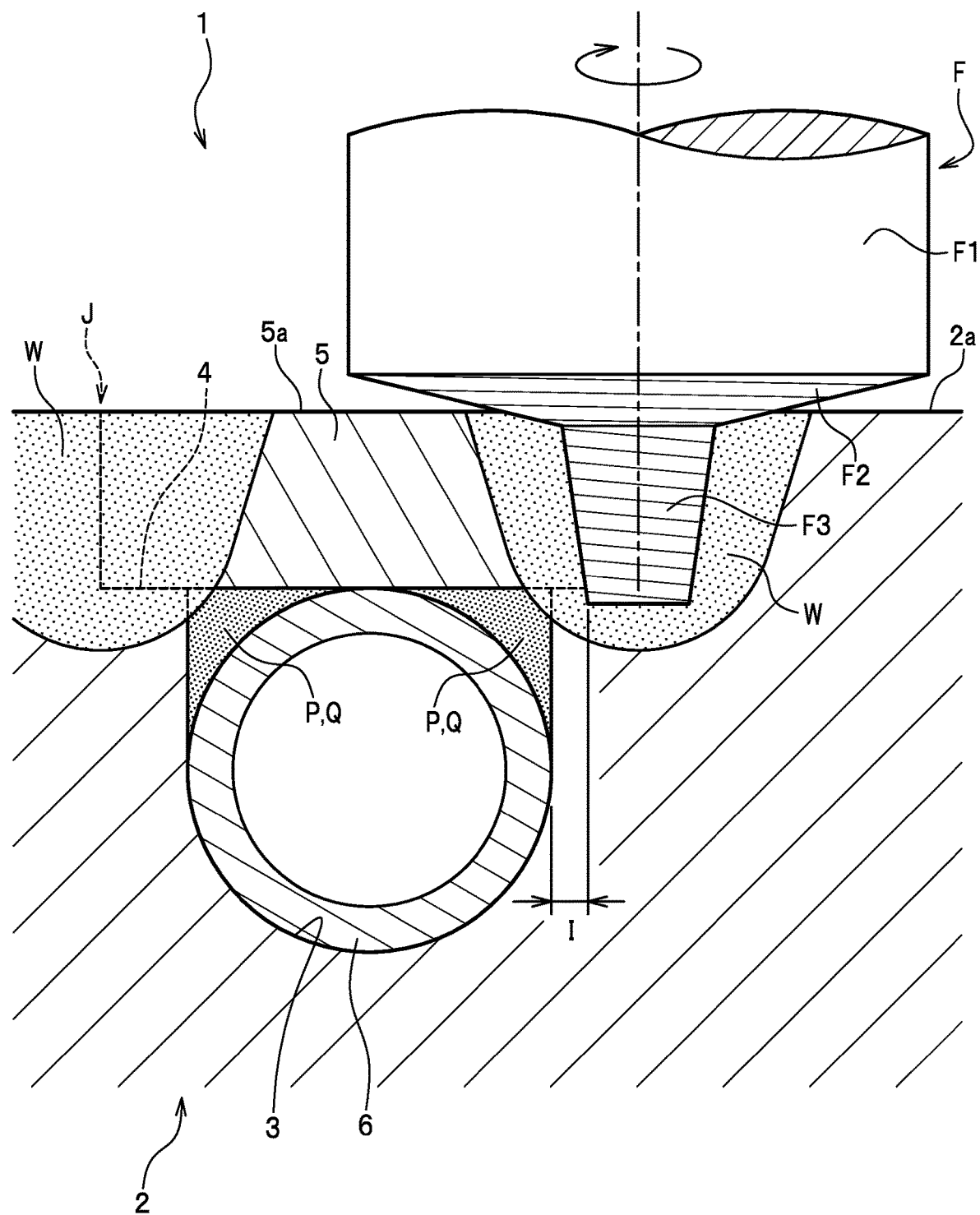
FIG. 10 is an enlarged sectional view showing a positional relationship between the primary joining rotary tool and the heat transfer plate according to the first embodiment.

As shown in FIG. 10, in the primary joining process, plastically fluidized material Q, which is formed because of frictional heat generated by the primary joining rotary tool F, is flowed into the corresponding void portion P. That is, plastically fluidized material Q is pushed to flow into the corresponding void portion P by the pushing force of the outer circumferential face of the base side pin F2 of the primary joining rotary tool F. When the primary joining process is performed, an insertion depth, an insertion position and the like of the primary joining rotary tool F can be appropriately set according to a shape, a size and the like of the corresponding void portion P. Hereby, plastically fluidized material Q can be suitably flowed into the corresponding void portion P.

It is preferable that an insertion amount (insertion length) of the primary joining rotary tool F is set so that a volume of metal of the lid plate 5 which is pushed away by the base side pin F2 is equal to the sum of a volume of the corresponding void portion P adjacent to the heat medium pipe 6 and a volume of burrs generated on the both sides of the corresponding plasticized region W, W in the width direction. It is preferable that the primary joining rotary tool F (or positions of the butted portions J, J) is brought close to the heat medium pipe 6 to the extent that the heat medium pipe 6 is not crushed. For example, in a case where the closest distance between the tip of the tip side pin F3 and a virtual vertical plane in contact with the outer circumferential face of the heat medium pipe 6 is set as an offset amount I, it is preferable that the offset amount I is 1 to 3 mm. An insertion depth of the tip side pin F3 may be appropriately set in a range capable of flowing the plastically fluidized material Q into the corresponding void portion P. In the embodiment, it is set to such a depth that the tip of the tip side pin F3 is inserted deeper than the bottom face of the lid groove 4. Plasticized region W is formed along the moving track of the primary joining rotary tool F.

In addition, a burr removing process to remove burrs generated by friction stirring may be performed after having finished the primary joining process. By performing the burr removing process, the surfaces of the base member 2 and the lid plate 5 can be smoothly finished.

Figure 11A:
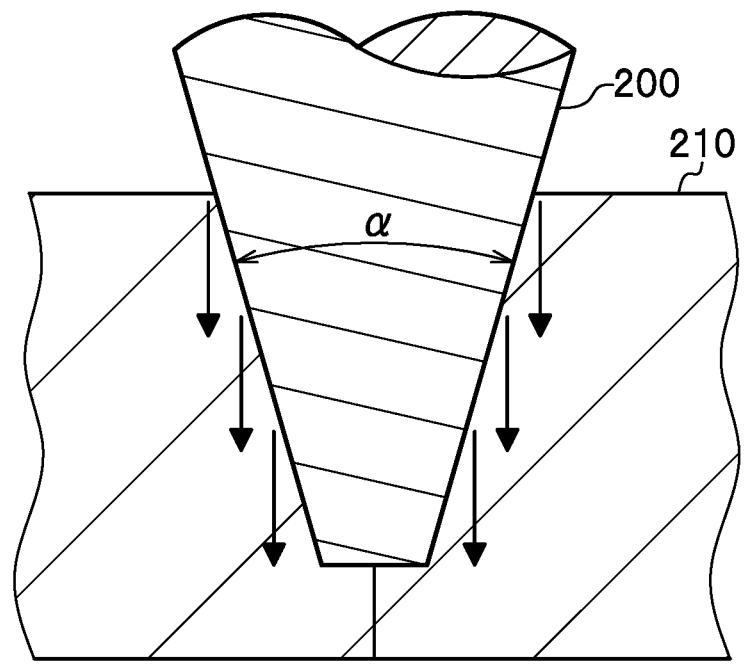
FIG. 11A is a schematic view showing a prior rotary tool.
Figure 11B:
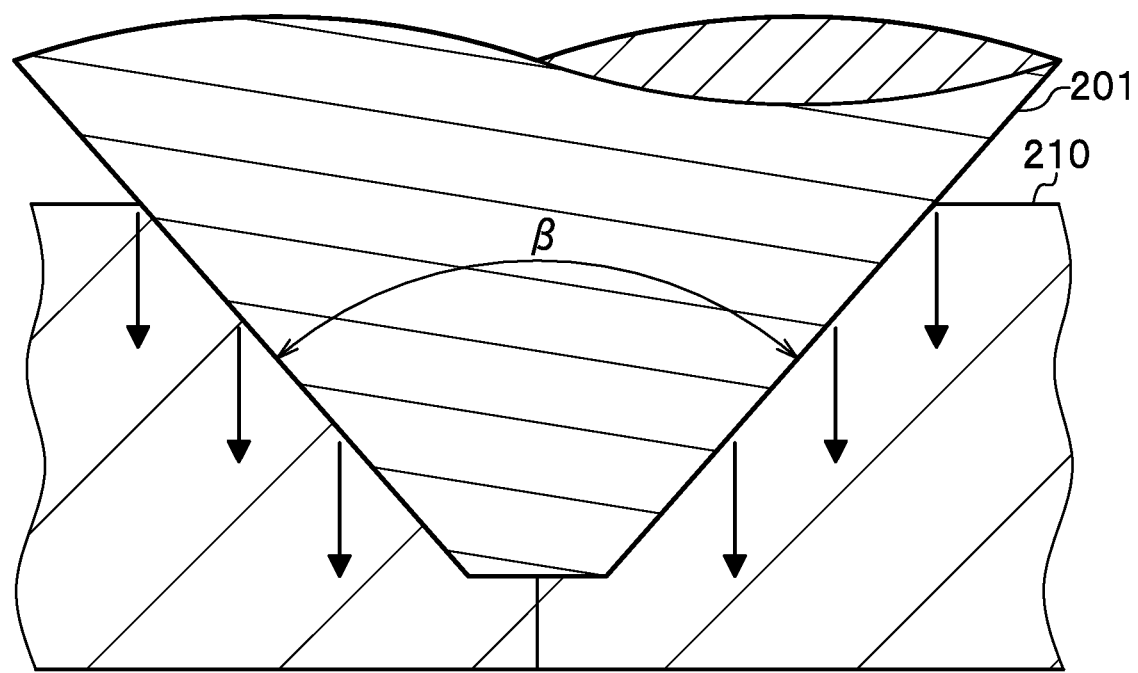
FIG. 11B is a schematic view showing a prior rotary tool.

Here, for example, as shown in FIG. 11A, there are problems that since a conventional rotary tool 200 does not press the surface of the metal members 210 to be joined by the shoulder portion thereof, a step concave groove, which is formed by the surface of the metal members to be joined and the surface of the plasticized region, is larger and the joined surface roughness is larger. Further, there is a problem that a bulge, which is a swelling portion on the surface of the metal members to be joined, is formed beside the step concave groove. Further, like the rotary tool 201 shown in FIG. 11B, in a case where the taper angle β of the rotary tool 201 is larger than the taper angle α of the rotary tool 200, since the rotary tool 201 can press the surface of the members 210 to be joined more than the rotary tool 200, the step concave groove is smaller and the bulge is also smaller. However, since downward plastic flow is stronger, kissing bonds tend to be caused in the lower portion of the plasticized region.

On the other hand, the primary joining rotary tool F of the embodiment is provided with the base side pin F2 and the tip side pin F3 having the taper angle smaller than the taper angle A of the base side pin F2. Hereby, it is easy to insert the primary joining rotary tool F into the butted portion J. Further, since the taper angle B of the tip side pin F3 is smaller, it is easy to insert the primary joining rotary tool F up to a deeper position of the butted portion J. And furthermore, since the taper angle B of the tip side pin F3 is smaller, the downward plastic flow can be suppressed compared to the rotary tool 201, and thus it is possible to prevent the occurrence of the kissing bonds in the lower portion of the plasticized region W. On the other hand, since the taper angle A of the base side pin F2 is larger, stabler joining can be performed compared to a conventional rotary tool even if the thickness of the metal members to be joined and/or the height position of the joining are changed.

Further, since the outer circumferential face of the base side pin F2 can press plastically fluidized material, the step concave groove formed on the joined portion can be smaller and the bulge to be formed beside the step concave groove can be prevented from being generated or made smaller. And further, since the stepwise step portion F21 is shallower and the outlet thereof is wider, plastically fluidized material easily flows out to the outside while the plastically fluidized material is pressed by the step bottom face F21a. Therefore, though the plastically fluidized material is pressed by the base side pin F2, the plastically fluidized material is hard to adhere to the outer circumferential face of the base side pin F2. Accordingly, the joined surface roughness can be made smaller and the joining quality can be suitably made stable.

Since the corresponding void portion P can be filled up by flowing the plastically fluidized material Q into the corresponding void portion P, heat can be efficiently transferred between the heat medium pipe 6 and the base member 2 and the lid plate 5 located around the heat medium pipe 6. Accordingly, the heat transfer plate 1 having a high heat exchange efficiency can be manufactured.

In the primary joining process, the plastically fluidized material Q can be more reliably flowed into the void portion P by inserting the tip of the tip side pin F3 deeper than the bottom face of the lid groove 4.

In the primary joining process, since the closest distance between the tip of the tip side pin F3 and the virtual vertical plane in contact with the outer circumferential face of the heat medium pipe 6 is 1 to 3 mm, the plastically fluidized material Q can be more reliably flowed into the void portion P.

In the primary joining process, though it is not always necessary to perform friction stirring along the whole length of the butted portions J, J in the depth direction, the watertightness and airtightness of the heat transfer plate 1 can be enhanced in a case where friction stirring is performed along the whole length of the butted portion J in the depth direction.

By performing the provisional joining process, opening between the base member 2 and the lid plate 5 can be prevented when the primary joining process is performed. Furthermore, in the provisional joining process and the primary joining process, work effort can be reduced in a case where each of the provisional joining rotary tool G and the primary joining rotary tool F is moved in a one-stroke manner while the provisional joining rotary tool G and the primary joining rotary tool F are not removed from the base member 2 in the provisional joining process and the primary joining process, respectively.

Note that, in the provisional joining process, friction stirring may be discontinuously performed so that the plasticized region W1 to be formed by the provisional joining rotary tool G is formed discontinuously. Furthermore, in the provisional joining process, the butted portions J, J may be joined by welding.

For example, the shapes of the concave groove 3, the lid groove 4, the lid plate 5 and the heat medium pipe 6 according to the first embodiment are examples, so other shapes may be allowable. Further, in a case where a step is generated between the front face 2a of the base member 2 and the surface of the plasticized region W, overlay welding may be performed to fill up the step after the primary joining process. Or, a metal member is disposed on the surface of the plasticized region W, and friction stir welding may be performed to the metal member and the base member 2 by using the primary joining rotary tool F.

In the embodiment, the lid plate 5 is disposed on the upper face side of the base member 2, but it may be disposed on the lower face side.

Second Embodiment

Next, a second embodiment of the present invention will be described. A heat transfer plate 1A according to the second embodiment is provided with an upper lid groove 7 formed on the front face 2a side relative to the lid groove 4, and an upper lid plate 8 is disposed in the upper lid groove 7. This point differs from the first embodiment.

In a method for manufacturing the heat transfer plate according to the second embodiment, a preparation process, a heat medium pipe insertion process, a lid plate insertion process, a provisional joining process, a primary joining process, an upper lid plate insertion process and an upper lid joining process are performed.

Figure 12:
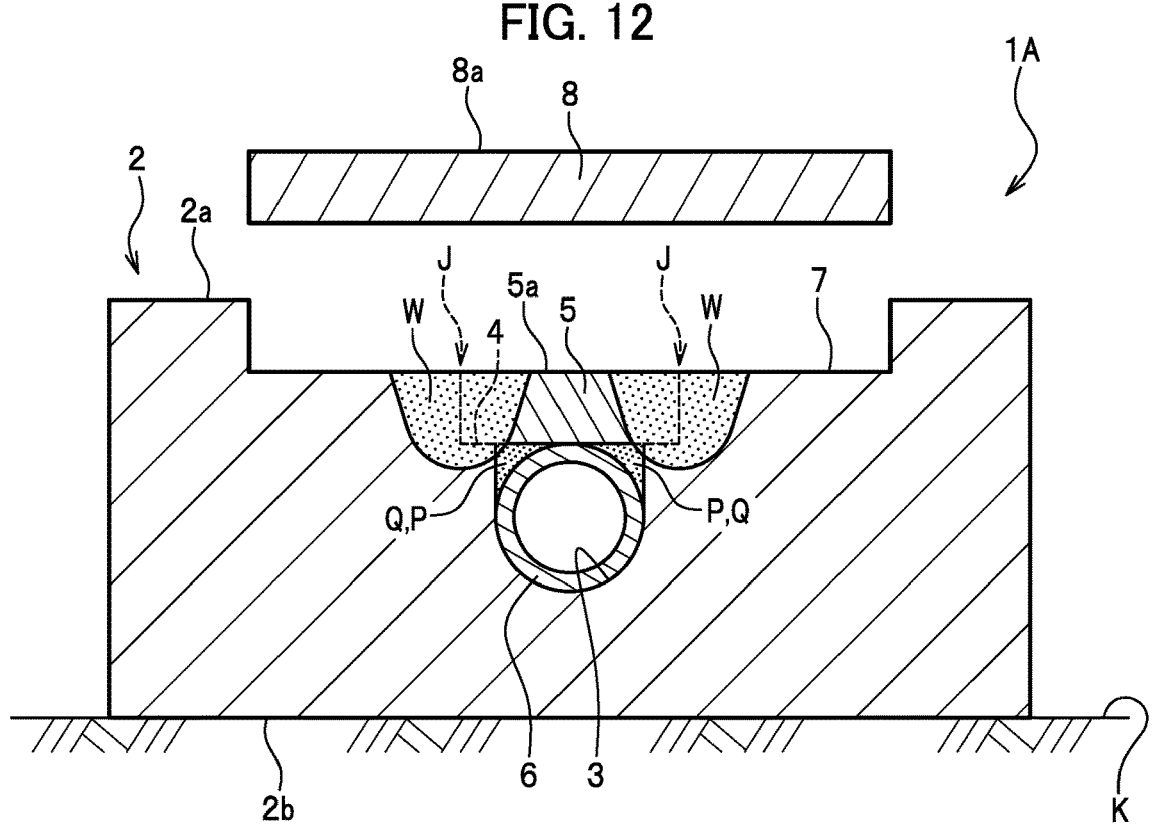
FIG. 12 is an exploded sectional view showing a method for manufacturing a heat transfer plate according to a second embodiment of the present invention, the view showing a view after a primary joining process.

As shown in FIG. 12, the preparation process is a process to prepare the base member 2. First, the base member 2 is fixed onto the work table K by means of clamps (not shown). And then, the concave groove 3, the lid groove 4 and the upper lid groove 7 are formed by cutting with use of an endmill or the like. Note that, the base member 2 where the concave groove 3, the lid groove 4 and the upper lid groove 7 are formed beforehand by die casting, extrusion or the like may be used. The upper lid groove 7 is formed wider than the lid groove 4 and formed continuously with the lid groove 4 on the front face 2a side of the lid groove 4. The upper lid groove 7 has a rectangular shape in cross section and is opened to the front face 2a side.

The heat medium pipe insertion process is a process to insert the heat medium pipe 6 into the concave groove 3. The heat medium pipe insertion process is performed in the same manner as that in the first embodiment.

The lid plate insertion process is a process to insert the lid plate 5 into the lid groove 4. The butted portions J are formed by butting respectively side walls of the lid groove 4 against the side faces of the lid plate 5. The lid plate 5 is inserted into the lid groove 4, so that the heat medium pipe 6 is brought in contact with the lid plate 5 and a bottom face of the upper lid groove 7 and the upper face of the lid plate 5 are flush with each other.

The provisional joining process is a process to preliminarily perform joining to the butted portions J, J. The provisional joining process is performed in the same manner as that in the first embodiment.

The primary joining process is a process to perform friction stir welding to the butted portions J, J with use of the primary joining rotary tool F. The primary joining process is performed in the same manner as that in the first embodiment. The plasticized regions W, W are formed along moving tracks of the primary joining rotary tool F. The plasticized regions W are formed along the whole length of the butted portions J, J in the depth direction.

Figure 13:
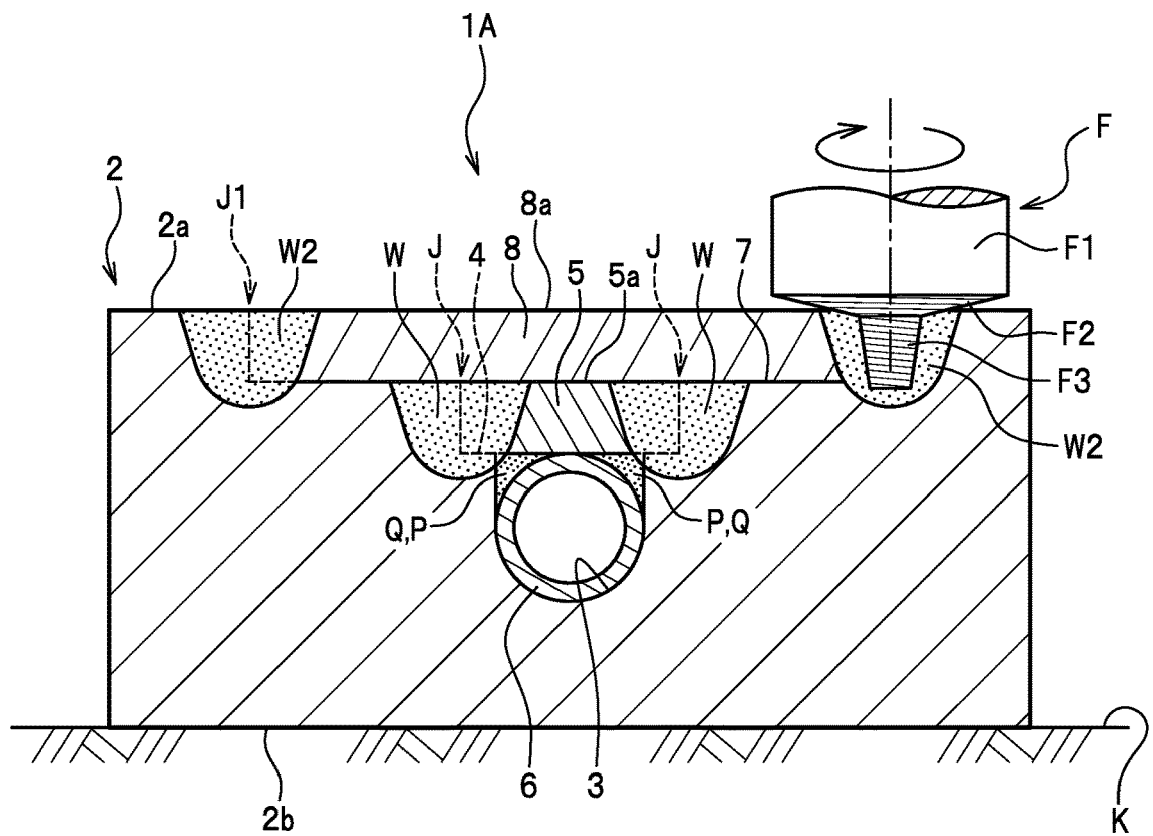
FIG. 13 is a sectional view showing an upper lid plate joining process of the method for manufacturing the heat transfer plate according to the second embodiment of the present invention.

As shown in FIG. 13, the upper lid plate insertion process is a process to insert the upper lid plate 8 into the upper lid groove 7 after the primary joining process. The upper lid plate 8 is a plate like member to be disposed on the surface side of the lid plate 5. The upper lid plate 8 has the same shape as that of a hollow portion of the upper lid groove 7 so that the upper lid plate 8 is inserted into the upper lid groove 7 without gap. Upper butted portions J1, J1 are formed by butting respectively a pair of side walls of the upper lid groove 7 against a pair of side faces of the upper lid plate 8. Material of the upper lid plate 8 is not specifically limited as long as it can be frictionally stirred, and in this embodiment, it is an aluminum alloy. The base member 2 is made of, for example, a material harder than the upper lid plate 8.

The upper lid joining process is a process to perform friction stir welding to the upper butted portions J1, J1 with use of the primary joining rotary tool F. In the upper lid joining process, friction stir welding is performed while the base side pin F2 and the tip side pin F3 are in contact with the base member 2 and the upper lid plate 8. The friction stir welding is performed while the tip side pin F3 of the primary joining rotary tool F which is rotating is inserted into the corresponding upper butted portion J1 and the base member 2 and the upper lid plate 8 are pressed by the outer circumferential face of the base side pin F2. The primary joining rotary tool F is relatively moved along the corresponding upper butted portion J1. Insertion depths of the base side pin F2 and the tip side pin F3 may be appropriately set in the range where the outer circumferential face of the base side pin F2 can press the base member 2 and the upper lid plate 8. For example, the insertion depths of the base side pin F2 and the tip side pin F3 may be set in a range where the outer circumferential face of the base side pin F2 can press the base member 2 and the upper lid plate 8 and set to such depths that the tip side pin F3 reaches the bottom face of the upper lid groove 7. In this embodiment, the insertion depths are set to such depths that a middle portion of the outer circumferential face of the base side pin F2 in the height direction is brought in contact with the front face 2a of the base member 2 and the front face 8a of the upper lid plate 8. Plasticized regions W2, W2 are formed along moving tracks of the primary joining rotary tool F. Each plasticized region W2 is formed along the whole length of the corresponding one of the upper butted portions J1, J1 in the depth direction.

The method for manufacturing the heat transfer plate according to the second embodiment has approximately the same advantageous effects as those of the first embodiment.

In also the upper lid joining process, since plastically fluidized material can be pressed by the outer circumferential face of the base side pin F2, a step concave groove to be formed on the joined surface can be made smaller and a bulge to be formed beside the step concave groove can be prevented from being generated or made smaller. And further, since the stepwise step portion F21 is shallower and the outlet thereof is wider, plastically fluidized material easily flows outside the step portion F21 while the plastically fluidized material is pressed by the step bottom face F21a. Therefore, though the plastically fluidized material is pressed by the base side pin F2, the plastically fluidized material is hard to adhere to the outer circumferential face of the base side pin F2. Accordingly, the joined surface roughness can be made smaller and the joining quality can be suitably made stable.

Furthermore, since the upper lid plate 8 is disposed on the front face 2a side with respect to the lid plate 5 and friction stir welding is performed to the corresponding upper butted portion J1 formed by a side wall of the upper lid groove 7 and a side face of the upper lid plate 8 being butted against each other, the heat medium pipe 6 can be located at a deeper position. Since the conventional method has a concern that a gap is generated when the upper lid plate 8 is disposed in the upper lid groove 7, face-cutting of the bottom face of the upper lid groove 7 is necessary. However, in this embodiment, since the step concave groove is made smaller and the occurrence of burrs is reduced, the face-cutting after the primary joining process is not required or can be omitted.

For example, the shapes of the concave groove 3, the lid groove 4, the lid plate 5, the heat medium pipe 6, the upper lid groove 7 and the upper lid plate 8 according to the second embodiment are merely examples, and other shapes may be adopted. Further, in a case where a step is generated between the front face 2a of the base member 2 and the surface of the plasticized region W2, overlay welding may be performed to fill up the step after the primary joining process. Or, a metal member is disposed on the surface of the plasticized region W2, and friction stir welding may be performed to the metal member and the base member 2 with use of the primary joining rotary tool F.

In the embodiment, the lid plate 5 and the upper lid plate 8 are disposed on the upper face side of the base member 2, but they may be disposed on the lower face side.

REFERENCE SIGNS LIST 1, 1A Heat transfer plate
2 Base member
3 Concave groove
4 Lid groove
5 Lid plate
6 Heat medium pipe
7 Upper lid groove
8 Upper lid plate
F Primary joining rotary tool (Rotary tool)
F2 Base side pin
F3 Tip side pin
J Butted portion
J1 Upper butted portion
W, W2 Plasticized region
P Void portion
Q Plastically fluidized material

The invention claimed is:

1. A method for manufacturing a heat transfer plate, comprising:
   a heat medium pipe insertion process to insert a heat medium pipe into a concave groove formed in a bottom face of a lid groove which opens to a front face of a base member;
   a lid plate insertion process to insert a lid plate into the lid groove; and
   a joining process to perform friction stirring while a rotary tool provided with a base side pin and a tip side pin is moved along a butted portion formed by a side wall of the lid groove and a side face of the lid plate being butted against each other,
   wherein a taper angle of the base side pin of the rotary tool is 135 to 160 degrees and is larger than another taper angle of the tip side pin,
   wherein a stepwise step portion is formed on an outer circumferential face of the base side pin,
   wherein a helical groove is formed on an outer circumferential face of the tip side pin, the helical groove being formed of a helical bottom face and a helical side face,
   wherein an angle defined by the helical bottom face and the helical side face is 45 to 90 degrees,
   wherein the helical bottom face of the helical groove adjoins the helical side face of the helical groove at an outer side of the tip side pin, and the helical side face of the helical groove adjoins the helical bottom face of the helical groove at an inner side of the tip side pin, and wherein in the joining process, friction stirring is performed while the tip side pin of the rotary tool which is rotating is inserted into the butted portion and the outer circumferential face of the base side pin is in contact with the base member and the lid plate, and plastically fluidized material fluidized by frictional heat is flowed into a void portion formed adjacent to the heat medium pipe.

2. The method for manufacturing a heat transfer plate according to claim 1, wherein in the joining process, a tip of the tip side pin is inserted deeper than the bottom face of the lid groove.

3. The method for manufacturing a heat transfer plate according to claim 1, wherein in the joining process, the closest distance between a tip of the tip side pin and a virtual vertical plane in contact with the heat medium pipe is 1 to 3 mm.

4. The method for manufacturing a heat transfer plate according to claim 1, after the joining process, further comprising:

an upper lid plate insertion process to insert an upper lid plate into an upper lid groove formed on a surface side with respect to the lid groove and wider than the lid groove; and an upper lid joining process to perform friction stirring while the rotary tool provided with the base side pin and the tip side pin is moved along an upper butted portion formed by a side wall of the upper lid groove and a side face of the upper lid plate being butted against each other, wherein in the upper lid joining process, the friction stirring is performed while the tip side pin of the rotary tool which is rotating is inserted into the upper butted portion and the outer circumferential face of the base side pin is in contact with the base member and the upper lid plate.

5. The method for manufacturing a heat transfer plate according to claim 2, wherein in the joining process, the closest distance between the tip of the tip side pin and a virtual vertical plane in contact with the heat medium pipe is 1 to 3 mm.

6. The method for manufacturing a heat transfer plate according to claim 1, wherein the stepwise step portion of the base side pin is spiral in a plan view and stepwise in a side view, wherein the stepwise step portion is formed of a step bottom face and a step side face, the step bottom face being formed in a circumferential direction from an axis of the rotary tool, wherein an angle defined by the step bottom face and the step side face is 85 to 120 degrees, and wherein the step bottom face of the stepwise step portion adjoins the step side face of the stepwise step portion at an outer side of the base side pin, and the step side face of the stepwise step portion adjoins the step bottom face of the stepwise step portion at an inner side of the base side pin.

* * * * *